United States Patent Office 3,062,804
Patented Nov. 6, 1962

3,062,804
PEPTIDE SYNTHESIS AND INTERMEDIATES THEREFOR
Noel F. Albertson, East Greenbush, N.Y., assignor to Sterling Drug Inc., New York, N.Y., a corporation of Delaware
No Drawing. Filed Mar. 8, 1957, Ser. No. 644,714
14 Claims. (Cl. 260—112)

This invention relates to a new method for the preparation of alpha-amino carboxamides, especially peptides, and to novel compounds useful in said method. More particularly, this invention relates to a method for preparation of peptides using intermediates in which the tertiary butoxycarbonyl radical is used as an amine-masking group.

In the synthesis of petides by the appropriate coupling of an alpha-amino carboxylic acylating agent with an alpha-amino carboxylic acid or peptide, or ester thereof, the satisfactory masking of the alpha-amino group in the acylating agent during the coupling reaction and the subsequent removal of the masking agent present great difficulties because the masking agent must be easily removable and, if it is desired to retain optical activity, racemization of the alpha-amino carboxylic acids and the peptides must of course be avoided. N-(benzyloxycarbonyl) derivatives of alpha-amino carboxylic acylating agents have been used with considerable success for many years in preparing peptides by the well-known Bergmann and Zervas carbobenzoxy synthesis. However, it has long been appreciated that these benzyloxycarbonyl compounds have certain disadvantages which prevent their being completely satisfactory as peptide intermediates. Thus, for example, although it is frequently desirable to have an amino group remain protected by a masking radical under conditions of catalytic hydrogenation, the N-(benzyloxycarbonyl)amino acid derivatives are of course readily cleaved by hydrogen under these conditions to remove the masking carbobenzoxy radical. Moreover, when the N-(benzyloxycarbonyl)amino acid derivatives are cleaved with anhydrous hydrogen bromide or iodide, there is produced benzyl bromide or benzyl iodide, both of which are lachrymators. In addition, the removal of the benzyloxycarbonyl masking group from alpha-(N-benzyloxycarbonyl)peptides containing certain amino acid moieties, such as those of methionine and tryptophane gives poor yields of the desired peptides, due to attack by the benzyl ion produced in the reaction, when acid cleavage is employed.

It is one of the primary objects of the present invention, therefore, to provide improved means for masking alpha-amino groups in the alpha-amino carboxylic acylation of alpha-amino carboxylic acids and peptides, thereby to afford not only a needed and valuable new alternative to the old methods but also specific advantages over the prior art methods for certain purposes.

Generally speaking, in carrying out the present invention, an alpha-amino group in an alpha-amino carboxylic acid ester or in a peptide ester is masked by conversion to an alpha-(N-tertiary butoxycarbonyl) derivative of the ester, the resulting amine-masked ester is converted to an appropriate functional carboxylic derivative and then used to acylate a lower alkyl or benzyl ester of an alpha-amino carboxylic acid or of a peptide, in accordance with the known general procedures, to produce an alpha-(N-tertiary butoxycarbonyl)peptide ester, and finally the desired peptide is obtained by deesterification and by removal of the amine-masking tertiary butoxycarbonyl radical, or, if the peptide ester is desired, the deesterification step is omitted.

The initial steps of this process leading to formation of the alpha-(N-tertiary butoxycarbonyl)peptide are entirely analogous to the amine-masking procedures which can be employed for formation of the old alpha-(N-benzlyoxycarbonyl)peptide esters using a benzyloxycarbonyl masking radical. Thus, for example the preparation of our new alpha-(N-tertiary butoxycarbonyl)peptides and esters thereof can be readily carried out using the method described by Vaughan at J. Am. Chem. Soc., 73, 3547 (1951), wherein mixed anhydrides of carbonic acid and carboxylic acids are employed. For instance, the preparation of alpha-(N-tertiary butoxycarbonyl)dipeptide esters can be illustrated by the following reaction.

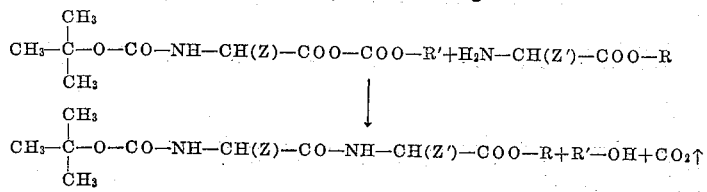

where Z and Z' are the organic radicals of the same or different alpha-amino carboxylic acids having the formula $H_2N-CH(Z)-COOH$ or $H_2N-CH(Z')-COOH$, and R and R' are lower alkyl or benzyl. The preparation of alpha-(N-tertiary butoxycarbonyl)tri- and polypeptide esters can be prepared in similar fashion by using a dipeptide ester or polypeptide ester instead of the amino acid reactant, $H_2N-CH(Z')-COOR$.

The mixed anhydrides employed in the above procedure can be readily obtained by treating a lower alkyl or benzyl chlorocarbonate, $Cl-CO-O-R'$, with a triethylamine salt of an alpha-(N-tertiary butoxycarbonyl)amino carboxylic acid, $(CH_3)_3C-O-CO-NH-CH(Z)-COOH$, in an inert solvent such as toluene or chloroform at 0–10° C. for about thirty minutes.

The alpha-(N-tertiary butoxycarbonyl)amino carboxylic acids, $(CH_3)_3C-O-CO-NH-CH(Z)-COOH$, are novel compounds which are highly valuable as indicated above as peptide intermediates. These compounds of our invention are conveniently prepared by interaction of tertiary butyl alcohol with isocyanates derived from alpha-amino carboxylic acid esters, $OCN-CH(Z)-COO-R$, in known manner and saponification of the resulting alpha-(N-tertiary butoxycarbonyl)amino carboxylic esters, $(CH_3)_3C-O-CO-NH-CH(Z)-COO-R$.

Despite the fact that the introductory steps of our process taken alone would afford no particular advantage over prior art procedures, they are novel and of course make a valuable contribution to our new peptide synthesis as a whole.

The advantages afforded by our new process reside in an important degree in the step of removing the amine-masking radical. In this step, by virtue of the valuable and unexpected properties of the novel alpha-(N-tertiary butoxycarbonyl)peptide and corresponding esters of our invention described more fully hereinafter, our new process affords readily and conveniently a satisfactory yield of the corresponding peptides or peptide esters. This procedure does not cause racemization, and is readily applicable to the preparation of both optically active and optically inactive peptides. Described more particularly than above, this step of our new process comprises treating an amine-masked compound of the class consisting of alpha-(N-tertiary butoxycarbonyl)peptides and lower alkyl and benzyl esters thereof, wherein an alpha-amino group is substituted by a tertiary butoxycarbonyl masking radical, with a substantially anhydrous strong acid, thereby removing the said amine-masking radical from the amino group.

The removal of the amine-masking tertiary butoxycarbonyl radical is carried out easily and conveniently by treating a solution or suspension of the amine-masked peptide or ester thereof in a non-aqueous organic solvent with a substantially anhydrous strong organic or inorganic acid. The reaction proceeds rapidly and smoothly at room temperature with evolution of carbon dioxide and the resulting peptide or peptide ester is easily isolated from the reaction mixture. The removal of the tertiary butoxycarbonyl radical under these conditions is complete within a few minutes. The strong acid used in this reaction can be, for example, hydrochloric acid, hydrobromic acid, hydriodic acid, sulfuric acid, phosphoric acid, methanesulfonic acid, p-toluenesulfonic acid, or the like. The reaction medium can be any suitable substantially anhydrous organic liquid which does not interfere with the reaction, for example nitromethane, acetic acid, benzene, chloroform, carbon tetrachloride, ethyl acetate, and dioxane.

It is usually preferred to carry out the reaction at low or moderate temperatures since as is well-known many peptides have a tendency to be adversely affected by excessive heat. For this reason, and also since the application of heat is not necessary, we ordinarily carry out the removal of the tertiary butoxycarbonyl radical at or near room temperature, for example, at about 20–30° C.

We have found that a very satisfactory general procedure for carrying out the removal of the tertiary butoxycarbonyl radical is to bubble hydrogen chloride or hydrogen bromide into a solution or suspension of the alpha-(N-tertiary butoxycarbonyl)peptide, or ester thereof, at room temperature in anhydrous nitromethane.

The alpha-(N-tertiary butoxycarbonyl)peptides and alpha-(N-tertiary butoxycarbonyl)peptide esters which are obtained as intermediates in our above-described process are novel and valuable products and constitute one aspect of the instant invention. These compounds in many instances are white solids having relatively low melting points, while other members of this group are usually obtained as viscous syrups. In general, they are insoluble in water and aliphatic hydrocarbons, and soluble in most of the common polar organic solvents such as alcohols, ketones, esters, aliphatic carboxylic acids, and dimethylformamide. The alpha-(N-tertiary butoxycarbonyl)peptides are generally higher melting that the corresponding esters and the former, due to the carboxyl groups, are soluble in organic and inorganic bases. The esters are readily purified by dissolving in warm ethyl acetate and adding n-hexane until faint turbidity persists and then cooling to cause separation of the purified product.

An obvious advantage afforded by our invention is that it is a desirable addition to the available procedures for peptide synthesis for use in instances where it is inconvenient or impractical to employ the known methods. Particularly, the process of the present invention affords advantages over the conventional benzyloxycarbonyl method when the peptide involved contains methionine and tryptophan or either of these acids. An especially advantageous feature of our invention is that by use in conjunction with the benzyloxycarbonyl method it provides means for differentially removing the two types of amine-masking radicals involved. Thus, for example, in a peptide containing two amino groups which are to be masked, the tertiary butoxycarbonyl radical can be used to mask one amino group and the benzyloxycarbonyl radical can be used to mask the other amino group. If desired, the tertiary butoxycarbonyl radical can be removed by treatment with anhydrous hydrogen chloride at room temperature for a few seconds; under these conditions the benzyloxycarbonyl radical is virtually unaffected. Or, on the other hand, the benzyloxycarbonyl radical can be readily removed by catalytic hydrogenation, which does not affect the tertiary butoxycarbonyl radical.

Our invention is illustrated by the following examples without, however, being limited thereto.

EXAMPLES

A. *Alpha-(N-Tertiary Butoxycarbonyl)Amino Carboxylic Esters,* $(CH_3)_3C—O—NH—CH(Z)—COO—R$, *and Corresponding Acids*

These compounds were prepared by the following method. The alpha-amino acid ester, $$H_2N—CH(Z)—COO—R$$

was converted to the isocyanate, $$OCN—CH(Z)—COO—R$$

by passing phosgene into a suspension of the ester hydrochloride in five to ten volumes of refluxing toluene until all of the suspended solid had dissolved; this required about three to seven hours. Toluene and the excess phosgene were then removed by distillation under reduced pressure. The residue, which consisted of the crude isocyanate was treated with a 25% excess of tertiary butyl alcohol for fifteen minutes on a steam bath. After standing at room temperature (about 25° C.) for one hour, the resulting alpha-(N-tertiary butoxycarbonyl)amino carboxylic ester was saponified with aqueous sodium hydroxide solution and acidified with hydrochloric acid to yield the corresponding acid, $$(CH_3)_3C—O—CO—CH(Z)—COOH$$

(In the case of N-(tertiary butoxycarbonyl)glycine it was necessary to extract the product from the aqueous solution with diethyl ether.) The alpha-(N-tertiary butoxycarbonyl)amino carboxylic acids were purified by recrystallization from ethyl acetate, and then treated with triethylamine to form the salts used as described in part B below.

The following compounds wherein the amino acid is naturally-occurring, were prepared by the foregoing procedure.

(1) N-(tertiary butoxycarbonyl)glycine; M.P. 85–89° C.; yield, 56%. *Analysis.*—Nitrogen: Calculated for $C_7H_{13}NO_4$, 7.99%; found, 7.98%. Neutral equivalent: Calculated, 175; found, 177.

(2) N - (tertiary butoxycarbonyl) - DL - alanine; M.P. 103–106° C.; yield, 55%. *Analysis.*—Nitrogen: Calculated for $C_8H_{15}NO_4$, 7.40%; found, 7.60%. Neutral equivalent: Calculated, 189; found, 184.

(3) N-(tertiary butoxycarbonyl)-DL-methionine; M.P. 87–91° C.; yield, 80%. *Analysis.*—Nitrogen: Calculated for $C_{10}H_{19}NO_4S$, 5.69%; found, 5.72%. Neutral equivalent: Calculated, 249; found, 252.

(4) N - (tertiary butoxycarbonyl) - L - leucine; M.P. 74–80° C.; yield, 72%. *Analysis.*—Calculated for $C_{11}H_{21}NO_4$, 6.06% N; found, 5.64% N.

(5) N - (tertiary butoxycarbonyl) - DL - phenylalanine; yellow syrup; yield, 61%.

(6) N-(tertiary butoxycarbonyl)-DL-valine; orange-red syrup; yield, 78%.

B. *Alpha-(N-Tertiary Butoxycarbonyl)Peptides and Esters Thereof*

These compounds were prepared by interacting the triethylamine salt of the alpha-(N-tertiary butoxycarbonyl) amino carboxylic acid, $$(CH_3)_3C—O—CO—NH—CH(Z)—COOH$$

with isobutyl chlorocarbonate in acetone at −10° C. for thirty minutes to form the mixed anhydride, (CH₃)₃C—O—CO—NH—CH—(Z)
                    —COO—COO—CH₂CH(CH₃)₂

A chloroform solution of the alpha-amino carpoxylic acid ester to be acylated was then added and the reaction mixture was allowed to warm to room temperature and stand overnight (about fifteen hours). The desired alpha-(N-tertiary butoxycarbonyl)peptide ester was separated from the reaction mixture by washing the reaction mixture with water and dilute aqueous sodium bicarbonate solution, drying, and diluting with petroleum ether to crystallize the product. The ester was saponified with aqueous alkali to obtain the corresponding alpha-(N-tertiary butoxycarbonyl)peptide.

Proceeding in accordance with the above procedure, there were prepared the following compounds.

(1) Alpha - (N - tertiary butoxycarbonyl)glycyl-DL-phenylalanine methyl ester; M.P. 89–92° C.; yield, 78%. *Analysis.*—Nitrogen: Calculated for $C_{17}H_{24}N_2O_5$, 8.33%; found, 8.08%.

(2) Alpha - (N - tertiary butoxycarbonyl)glycyl-DL-phenylalanine; M.P. 128–131° C.; yield, 55%. *Analysis.*—Nitrogen: Calculated, 8.68%; found, 8.74%.

(3) Alpha-(N-tertiary butoxycarbonyl) - DL - phenylalanylglycine methyl ester; M.P. 150–152° C.; yield, 45%. *Analysis.*—Nitrogen: Calculated for $C_{17}H_{24}N_2O_5$, 8.33%; found, 8.32%.

(4) Alpha - (N - tertiary butoxycarbonyl)-DL-phenylalanylglycine; M.P. 180–181° C.; yield, 66%. *Analysis.*—Nitrogen: Calculated, 8.68%; found, 8.64%. Neutral equivalent: Calculated, 322; found, 328.

(5) Alpha-(N-tertiary butoxycarbonyl) - DL - phenylalanylbeta-alanine ethyl ester; M.P. 102–106° C.; yield, 35%. *Analysis.*—Nitrogen: Calculated for $C_{19}H_{28}N_2O_5$, 7.68%; found, 7.81%.

(6) Alpha - (N - tertiary butoxycarbonyl)-DL-phenylalanyl-beta-alanine; M.P. 173-175° C.; yield, 86%. *Analysis.*—Nitrogen: Calculated, 8.33%; found, 8.29%.

(7) Alpha-(N-tertiary butoxycarbonyl)-DL-alanylglycine methyl ester; M.P. 101–102° C.; yield, 50%. *Analysis.*—Nitrogen: Calculated for $C_{11}H_{20}N_2O_5$, 10.76%; found, 10.75%.

(8) Alpha - (N-tertiary butoxycarbonyl)-DL-alanylglycine; M.P. 168–170° C.; yield, 72%. *Analysis.*—Nitrogen: Calculated, 11.37%; found, 11.29%. Neutral equivalent: Calculated, 246; found, 248.

(9) Alpha - (N-tertiary butoxycarbonyl)-DL-valylglycine methyl ester; M.P. 113–114° C.; yield, 72%. *Analysis.*—Nitrogen: Calculated for $C_{13}H_{24}N_2O_5$, 9.71%; found, 9.77%.

(10) Alpha-(N - tertiary butoxycarbonyl)-DL-valylglycine; M.P. 132–135° C.; yield, 24%. *Analysis.*—Nitrogen: Calculated, 10.21%; found, 10.32%.

(11) Alpha-(N - tertiary butoxycarbonyl)-L-leucyl-L-leucine ethyl ester; M.P. 130–133° C.; yield, 48%. *Analysis.*—Nitrogen: Calculated for $C_{19}H_{36}N_2O_5$, 7.52%; found, 7.58%.

(12) Alpha-(N-tertiary butoxycarbonyl) - L - leucyl-L-leucine; M.P. 153–155° C.; yield, 68%. *Analysis.*—Nitrogen: Calculated, 8.13%; found, 8.07%.

(13) Alpha - (N - tertiary butoxycarbonyl)glycyl-DL-methionine ethyl ester; colorless syrup; yield, 76%.

(14) Alpha - (N - tertiary butoxycarbonyl)glycyl-DL-methionine; M.P. 138–140° C.; yield, 51%. *Analysis.*—Nitrogen: Calculated, 9.14%; found, 9.09%. Neutral equivalent: Calculated, 306; found, 310.

(15) Alpha - (N - tertiary butoxycarbonyl)glycyl-DL-tryptophan ethyl ester; yellow syrup; yield, 97%.

(16) Alpha-(N-tertiary butoxycarbonyl)glycyl - DL-tryptophan; M.P. 157–159° C.; yield, 48%. *Analysis.*—Nitrogen: Calculated, 11.63%; found, 11.60%. Neutral equivalent: Calculated, 361; found, 363.

(17) Alpha-(N-tertiary butoxycarbonyl)-DL-methioninylglycine methyl ester; red syrup; yield, 74%.

(18) Alpha-(N-tertiary butoxycarbonyl)-DL-methioninylglycine; M.P. 138-141° C.; yield, 71%. *Analysis.*—Nitrogen: Calculated, 9.14%; found, 9.27%. Neutral equivalent: Calculated, 306; found, 306.

(19) Alpha-(N - tertiary butoxycarbonyl)glycyl-L-leucine methyl ester; pale yellow syrup; yield, 45%.

(20) Alpha-(N - tertiary butoxycarbonyl)glycyl-L-leucine; M.P. 112–116° C.; yield, 71%. Neutral equivalent: Calculated, 288; found, 274.

(21) Alpha - (N-tertiary butoxycarbonyl)-L-leucylglycine methyl ester; M.P. 128–131° C.; yield, 80%. *Analysis.*—Nitrogen: Calculated, 9.26%; found, 9.33%.

(22) Alpha-(N-tertiary butoxycarbonyl) - L-leucylglycine; M.P. 127–133° C.; yield, 96%.

C. *Peptides*

These compounds were prepared by treatment of the corresponding alpha-(N-tertiary butoxycarbonyl)peptides with anhydrous hydrogen bromide or anhydrous hydrogen chloride. The hydrogen halide was bubbled into a suspension of the amine-masked peptide in nitromethane for five minutes, and the reaction mixture was then allowed to stand for three hours. The mixture was then diluted with diethyl ether and filtered and the solid product collected in this manner was washed with diethyl ether. The peptide hydrobromide or hydrochloride thus obtained was converted to the free peptide by dissolving it in methanol and then adding ammonium hydroxide to precipitate the peptide, which was then collected and recrystallized from water-methanol or water-ethanol solution.

Proceeding in the above-described manner, the following peptides were prepared. The nitrogen analysis in each case as determined by titration in acetic acid with perchloric acid is designated N(AP) and as determined by the Kjeldahl method is designated as N(K).

(1) Glycyl-DL-methionine; M.P. 203–205° C. (dec.); yield, 92%. *Analysis.*—Nitrogen: For $C_7H_{14}N_2O_3S$, N(AP) calculated, 6.79%. Found, 6.66%. N(K) calculated, 13.58. Found, 13.38%.

(2) Glycyl-DL-tryptophan; M.P. 231–233° C. (dec.); yield, 52%. *Analysis.*—Nitrogen: For $C_{13}H_{15}N_3O_3$, N(AP) calculated, 5.36%. Found, 5.20%. N(K) calculated, 16.08%. Found, 15.62%.

(3) Glycyl - DL - phenylalanine; M.P. 272–273° C. (dec.); yield, 40%. *Analysis.*—Nitrogen: For $$C_{11}H_{14}N_2O_3$$

N(AP) calculated, 6.31%. Found, 6.03%. N(K) calculated, 12.62%. Found, 12.46%.

(4) DL-methionylglycine; M.P. 213–215° C. (dec.); yield, 80%. *Analysis.*—Nitrogen: For $C_7H_{14}N_2O_3S$, N(AP) calculated, 6.79%. Found, 6.60%. N(K) calculated, 13.58%. Found, 13.24%.

(5) DL-phenylalanylglycine; M.P. 273–275° C. (dec.); yield, 91%. *Analysis.*—Nitrogen: For $C_{11}H_{14}N_2O_3$, N(AP) calculated, 6.31%. Found, 6.25%. N(K) calculated, 12.62%. Found, 12.49%.

(6) DL-phenylalanyl-beta-alanine; M.P. 200–207° C. (dec.); yield, 38%. *Analysis.*—Nitrogen: For $$C_{12}H_{16}N_2O_3$$

N(AP) calculated, 5.93%. Found, 5.77%. N(K) calculated, 11.85%. Found, 11.75%.

(7) DL-valylglycine; M.P. 247° C. (dec.); yield, 95%. *Analysis.*—Nitrogen: For $C_7H_{14}N_2O_3$, N(AP) calculated, 8.04%. Found, 7.84%. N(K) calculated, 16.08%. Found, 15.95%.

(8) L-leucyl-L-leucine; M.P. 270–272° C. (dec.); $[\alpha]_D^{24}=-13.4°$ (8.1% solution in normal (1 N) sodium hydroxide solution); yield, 17%. *Analysis.*—Nitrogen: For $C_{12}H_{24}N_2O_3$, N(AP) calculated, 5.73%. Found, 5.41%. N(K) calculated, 11.47%. Found, 11.22%.

(9) DL-alanylglycine; M.P. 224–225° C. (dec.); yield, 91%. *Analysis.*—Nitrogen: For $C_5H_{10}N_2O_3$, N(AP) calculated, 9.59%. Found, 9.42%. N(K) calculated, 19.17%. Found, 19.22%.

D. *Preferential Masking Group Removal*

The following example illustrates the use of our invention removing the tertiary butoxycarbonyl amine-masking radical while leaving the benzyloxycarbonyl amine-masking radical intact.

14.1 g. of alpha-(N-tertiary butoxycarbonyl)glycyl-L-leucyl - epsilon-(benzyloxycarbonyl)-L-lysine hydrazide was added to 50 ml. of acetic acid containing 2.4 g. of hydrogen chloride dissolved therein. There was immediate evolution of carbon dioxide. The reaction vessel was cooled occasionally to keep the temperature of the reaction mixture below 30° C. After twenty minutes, diethyl ether was added to the mixture to precipitate the product. There was thus obtained 12.8 g. (95% yield) of glycyl-L-leucyl - epsilon-(benzyloxycarbonyl)-L-lysine hydrazide dihydrochloride as white crystals which melted at 115° C. *Analysis.*—Calculated for $C_{22}H_{36}N_6O_5 \cdot 2HCl$: Chloride, 13.19%; nitrogen, 15.64%. Found: Chloride, 12.99%; nitrogen, 16.07%.

Treatment of the starting material in the above example with hydrogen in the presence of a metal hydrogenation catalyst removes the benzyloxycarbonyl radical while the tertiary butoxycarbonyl radical is unaffected.

In the foregoing examples, as will be readily appreciated from the disclosures herein, the use of different optical forms of the starting alpha-amino carboxylic acid derivatives, for instance the use of a D-form instead of a DL-form, or an L-form instead of a DL-form or the like, leads to production of the corresponding optical form of the peptide or peptide ester product.

I claim:

1. The process which comprises: acylating a compound of the group consisting of lower alkyl and benzyl esters of alpha-amino carboxylic acids and lower alkyl and benzyl esters of peptides by treatment with an alpha-(N-tertiary butoxycarbonyl)-amino carboxylic acylating agent; deesterifying the resulting alpha-(N-tertiary butoxycarbonyl)peptide ester; and treating the alpha-(N-tertiary butoxycarbonyl)peptide thus obtained with a substantially anhydrous strong acid to remove the tertiary butoxycarbonyl radical and produce a peptide.

2. The process which comprises: acylating a compound of the group consisting of lower alkyl and benzyl esters of alpha-amino carboxylic acids and lower alkyl and benzyl esters of peptides by treatment with an alpha-(N-tertiary butoxycarbonyl)-amino carboxylic acylating agent; and treating the resulting alpha-(N-tertiary butoxycarbonyl)peptide ester with a substantially anhydrous strong acid to remove the tertiary butoxycarbonyl radical and produce a peptide ester.

3. The process which comprises: acylating a lower alkyl ester of an alpha-amino carboxylic acid by treatment with an alpha-(N-tertiary butoxycarbonyl)amino carboxylic acylating agent; deesterifying the resulting alpha-(N-tertiary butoxycarbonyl)dipeptide ester; and treating the alpha-(N-tertiary butoxycarbonyl)dipeptide thus obtained with a substantially anhydrous strong acid to remove the tertiary butoxycarbonyl radical and produce a dipeptide.

4. The process which comprises: acylating a lower alkyl ester of an alpha-amino carboxylic acid by treatment with an alpha-(N-tertiary butoxycarbonyl) amino carboxylic acylating agent; and treating the resulting alpha-(N-tertiary butoxycarbonyl)dipeptide lower alkyl ester with a substantially anhydrous strong acid to remove the tertiary butoxycarbonyl radical and produce a dipeptide lower alkyl ester.

5. The process which comprises treating an amine-masked compound of the group consisting of alpha-(N-tertiary butoxycarbonyl)peptides and lower alkyl and benzyl esters thereof with a substantially anyhdrous strong acid, thereby removing the tertiary butoxycarbonyl radical from said amine-masked compound.

6. The process which comprises treating an alpha-(N-tertiary butoxycarbonyl)dipeptide with a substantially anhydrous strong acid, thereby removing the tertiary butoxycarbonyl radical and producing a dipeptide.

7. The process which comprises treating an alpha-(N-tertiary butoxycarbonyl)peptide with substantially anhydrous hydrogen bromide, thereby removing the tertiary butoxycarbonyl radical and producing a peptide.

8. A compound of the group consisting of amine-masked peptides and lower alkyl and benzyl esters thereof, wherein an alpha-amino group of said compound contains a substituent tertiary butoxycarbonyl radical.

9. An amine-masked peptide wherein an alpha-amino group of said peptide contains a substituent tertiary butoxycarbonyl radical.

10. An amine-masked dipeptide wherein an alpha-amino group of said dipeptide contains a substituent tertiary butoxycarbonyl radical.

11. A lower alkyl ester of an alpha-(N-tertiary butoxycarbonyl) naturally occurring alpha-amino carboxylic acid.

12. An alpha-(N-tertiary butoxycarbonyl) naturally occurring alpha-amino carboxylic acid.

13. A compound selected from the group consisting of alpha-(N-tertiary butyloxycarbonyl) naturally occurring amino acids and their lower alkyl esters.

14. The benzyl ester of an alpha-(N-tertiary butoxycarbonyl) naturally occurring alpha-amino carboxylic acid.

References Cited in the file of this patent

UNITED STATES PATENTS

| | | |
|---|---|---|
| 2,683,728 | Mastin et al. | July 13, 1954 |
| 2,705,705 | Chirtel et al. | Apr. 5, 1955 |

OTHER REFERENCES

Anson: Adv. in Protein Chem., vol. 5, page 36 (1949).
Stevens et al.: J.A.C.S., vol. 72 (1950), pages 725–7.
Vaughan: J.A.C.S. vol. 73 (1951), page 3547.
Boissonnas et al.: Helv. Chim. Acta, vol. 36, page 877 (1953).